United States Patent Office 2,825,677
Patented Mar. 4, 1958

2,825,677

PROCESS FOR SEPARATING OIL FROM BITUMINOUS SANDS, SHALES, ETC.

Gordon Raymond Coulson, Calgary, Alberta, Canada

No Drawing. Application November 30, 1956
Serial No. 625,251

12 Claims. (Cl. 196—14)

This invention relates to methods of separating crude oil from bituminous sands, shales or other oil-bearing materials.

This application is a continuation-in-part of my copending application Serial No. 292,377, filed June 7, 1952, and now abandoned.

More particularly this invention relates to a process for separating liquid, semi-liquid or solid bitumen from naturally occurring mechanical admixtures thereof with mineral constituents. These may consist of sand, usually silica sand, calcium carbonate, magnesium carbonate, calcium sulfate, dolomite, clay, various silicates, iron sulfide, etc. The process is particularly adapted to separate such bituminous material, which will hereinafter on occasion be referred to as crude oil, from mixtures in which the mineral particles are more or less discrete or unconsolidated and comprise the major portion of the naturally occurring mixture, in order to recover a virtually solids-free material which may be used for the production of lighter oils in standard refinery operations. It is to be distinguished from those treatments of natural asphalt in which only coarser particles of sand, etc. are removed, leaving finely divided clays, etc. in the bitumen, these being desirable when the bitumen is used for paving, roofing, etc. When the mineral material is consolidated as in the case of certain sandstones, limestones, shales and the like, the mixture must be crushed prior to application of the process.

The oil contained in the mixture to be treated is characterized by high solubility in the low boiling solvents such as benzene, toluene, xylene, etc. either cracked or straight run, as well as in higher boiling hydrocarbons including petroleum naphtha, coal tar naphtha, kerosene, gas-oil and the like.

The materials to be treated by this invention are to be distinguished from asphaltic pyrobitumen and pyrobituminous shales (oil shales), which are characterized by low solubility in the hydrocarbon solvents and from which the oil values are primarily recoverable by retorting methods involving cracking or destructive distillation of the organic constituents to produce tars, lower boiling liquid hydrocarbons and gases.

The invention is particularly applicable to the so-called "tar sands" in which the oil is present as a highly viscous liquid or semiliquid having a specific gravity ranging upwardly from 0.9 and generally above 1.0, but usually being substantially less than 1.4. (As used herein the term "specific gravity" is that determined at 77° F.) In general, the melting point of the bitumen in its free state will be below about 90° F. although the process may be applicable to separation of oils having melting points say above 100° F. up to about 130° F. and over, the maximum possible being the boiling point of water.

The tar sands of the Athabasca district of north-west Canada are bituminous sands and are made up of an almost pure silica sand, each grain of which is surrounded by a layer of water which in turn is surrounded by a film of oil. The voids between the grains may be more or less filled with oil. The oil is very viscous and has a specific gravity varying from about 1.000 to about 1.025 at 77° F. It is believed that in their natural state, the water content of the oil sands has a greater surface tension than the oil, due to the high mineral content of the water. Thus, in the material state the oil constituent is the continuous phase and the water constituent is the discontinuous phase. Because of this relationship in the natural state the oil phase will displace the water phase and preferentially surround the sand particles. By reversing this naturally occurring relationship of surface tensions, and lowering the surface tension of the water below that of the oil, the water will preferentially displace the oil surrounding the sand particles, and the water will become the continuous phase. This is an important consideration in the operation of my process.

I have found that when the oil-bearing sand is mixed with a suitable solvent, the oil can then be displaced with water under certain conditions.

It is an object of my invention to provide a method of separating crude oil from bituminous sands, shales or other materials in which oil may be found in a state of nature, particularly where the specific gravity of the oil is 1.000 or more. The process is, however, useful where the specific gravity is .99 to .90 or even lower.

It is a further object of my invention to provide a method which may be used to recover the oil at any temperature from just above the freezing point of water to a point just below its boiling point.

It is a further object of my invention to provide such a method that will be speedy in operation.

It is yet another object of my invention to provide such a method that will require no large or costly or complicated equipment and thus provide an inexpensive process.

It is still a further object of my invention to provide such a method that will effect positive and efficient separation of the crude oil substantially free from solids and of a grade capable of refinement in standard refinery equipment.

My invention consists in a novel method of separation, and additions of certain substances, by which these and other objects are attained, and will be hereinafter fully described, and the novel features pointed out in the claims appended hereto.

Prior to my invention, there have been two main methods in use for the separation of crude oil from bituminous sands, shales, and other oil-bearing materials. One is what is known as the "hot water separation method," and has been used in a pilot plant established by the Government of the Province of Alberta at Bitumont. According to this method the bituminous sand is fed from a hopper into a screw conveyor. Here it is subjected to a jet of high pressure steam, which breaks up the lumps in the sand before it passes into a vat containing water which is maintained at about the boiling point. Here the sand is subjected to a jet of low pressure steam which serves both to further break up any lumps and to keep the water near the boiling point. Agitators are built into the vat to agitate the sand, in the presence of the hot water. This heat and agitation treatment causes a froth of oil, water and air to be formed above the level of the water in the tank, this frothy emulsion containing the oil, some air, and about 30% water together with a substantial amount of solids as fine sand and clay. The froth of oil and water thus formed is drawn off the top and run into settling tanks where it is allowed to settle long enough to permit additional solid particles of sand to fall out. The froth, with solid particles settled out, is then led into a dehydrator where the water which has been picked up during the process is removed by evaporation. The oil is then further processed in any standard refinery.

The disadvantages of this hot water process are as follows:

(1) When the high pressure steam jet heats the bituminous sand, the heat is sufficient to cause any free sulphur that might exist to combine chemically with the oil. Such free sulphur has been found to amount to as much as 10% of the total sulphur content of the oil. In my process such free sulphur is separated along with the sand and water. My process yields a product of lower sulphur content than that of the oil in the sand, or of the products of either the hot or cold water processes.

(2) The process picks up a very considerable amount of water along with the oil that later has to be removed in the dehydrator, thus necessitating additional operational steps, heat and equipment.

(3) Because a froth or emulsion is formed, separation of sand is incomplete since the froth picks up grains of sand, which is carried along with the oil through the various machines, including the dehydrator, pumps and other equipment used for later transportation and processing of the oil. Because the sand being subjected to the operation is of a very hard type, it causes considerable damage to the equipment due to abrasion, and may appear as an undesirable component of end products such as coke.

(4) The process requires large and costly equipment, particularly in the provision of settling tanks.

(5) The process is slow. In the agitation and washing tank the mixture must not only remain a considerable time but must be re-cycled or re-treated in order to recover all the oil. Also, the settling tanks must be of large surface area and much time is required for effective separation of the oil out of the mixture.

(6) Soda ash and a wetting agent are required to effect clean separation of the bitumen from the sand, and both of these are lost in the process.

The second principal method in use prior to my invention for separating oil from sand or shales was developed by the National Research Council in association with the Bureau of Mines, and is called the "Cold Water Separation Method."

According to this method, a diluent, such as kerosene, is added to the bituminous sand as it enters the plant. The mixture of sand and diluent such as kerosene is passed through a ball mill where the lumps are broken down and the kerosene thoroughly mixed with the bitumen. The mixture is then put through a Dorr classifier with large volumes of water added. Here most of the sand settles out, and an oil froth or emulsion is floated off the top in a manner similar to the hot water method. This operation is carried out at a temperature of 77° F. which is critical and must be maintained for efficient extraction by this method. The oil froth recovered by this method is then put through a dehydrator as in the hot water method and is then passed on to the other steps of refining. The oil froth thus recovered contains about the same percentage of water as that recovered by the hot water method.

The disadvantages of this method are:

(1) The operating temperature of 77° must be strictly maintained for best recovery.

(2) The process is slow, time being consumed during the settling operation and during classifying which requires a plurality of re-cycling operations.

(3) A high percentage of water is picked up in the froth which must be separated and disposed of.

(4) Soda ash and a wetting agent are required to effect clean separation of the bitumen from the sand and both of these are lost in the process.

Both the "hot water" and "cold water" methods are outlined in the Blair Report on "Alberta Bituminous Sands" published 1951, by the Government of the Province of Alberta.

In addition, methods of separating asphalt (i. e. oil together with suspended inert mineral matter generally of a colloidal character) from various oil-bearing materials have been suggested. In these processes, some coarse minerals separate but the fine material is retained, which is said to be desirable, such asphalts being used for paving, roofing and other similar purposes, but not as a source of crude oil for production of gasoline, gas, coke, etc. These processes are not applicable for the purposes of this invention.

The manner in which my invention attains the objects first set out, and overcomes the disadvantages of the former practice, will now be described.

My invention consists broadly of a method of separation of oil from Alberta and similar bituminous sands wherein there is added to the raw sand first an oil phase, such oil phase being a diluent or solvent for the bitumen. The diluent has a specific gravity substantially lower than the bitumen or oil constituent of the raw material, and should be capable of dissolving substantially all of the bitumen constituent and is thoroughly admixed therewith. The diluted sand, either with or without preliminary settling, is then introduced to a large volume of an aqueous medium which may be water alone, water with a surface agent added, or a solution of a neutral salt in water, such salt being capable of acting as an electrolyte. The combined mass is next subjected to pressure separation preferably in a centrifuge. This effects a 3-way separation of the constituents, namely a bottom layer of sand saturated with aqueous phase, an intermediate or barrier layer of aqueous phase, and an upper layer of dissolved oil substantially free of water and solids.

According to the invention the bituminous sands are mixed with a solvent which must be capable of dissolving substantially all of the bituminous constituents and also of reducing the specific gravity of these constituents so that the oil-solvent mixture has a specific gravity substantially below that of the aqueous phase. While relatively low boiling, normally liquid hydrocarbons such as benzene, xylene, toluene, gasoline, either cracked or straight run, petroleum naphtha, coal tar naphtha or the like may be employed provided precautions are taken to prevent loss thereof by evaporation, it is preferred to employ solvents having an initial boiling point of about 350–400° F. or higher, for example, the higher boiling petroleum naphthas, kerosene, gas-oil in the boiling range of furnace distillates or diesel fuels, etc. This obviates to a large degree the loss difficulties which might be encountered with the lower boiling materials and the recoveries of crude oil obtained are satisfactory. When lower boiling solvents are used, a vapor proof system should be used to avoid loss of solvent. Oils of an aromatic or olefinic character are the most efficacious since certain constituents of the tar-sand oils are more soluble in these than in predominantly paraffinic distillates. Indeed, where the tar-sand oil is of an asphaltic base, some constituents may be almost entirely insoluble in paraffinic solvents, particularly the lower boiling ones, and hence woud not be recovered.

I have found it advantageous to recycle a portion of the recovered oil mixed with the solvent since this, in some instances, appears to increase the ultimate recovery of oil from the sand. This reduces the proportion of solvent used, which, however, must be present in sufficient amounts to produce the specific gravity within the desired range of the recovered product. Where they are available, I prefer to employ the more unsaturated and/or aromatic distillates, either alone or admixed with some of the recovered oil which may be produced during the thermal or catalytic cracking or coking of hydrocarbon oils. The constituents of the tar-sand seem to be somewhat more compatible with solvents of this character and hence the degree of recovery is increased.

Where such cracked distillates are available on the premises they may be used in the form of side streams such as that normally employed as recycle stock in the cracking process. Thus, if the recovered oil is being cracked or coked at or near the recovery site, a side stream may be taken from the cracking or coke plant fractionating tower, mixed with the sands, the oil recovered and then the entire mixture returned to the cracking or coking operation, if desired by way of the fractionator.

In view of the fact that the crude oil recovered is too viscous for transportation through a pipeline, it is necessary to convert it to a more fluid form. A particularly desirable way of doing this is to subject a portion or all of the crude oil to a coking operation and the crude oil can be reduced to a gravity and viscosity suitable for transporting through a pipeline.

A particularly suitable diluent comprises the overhead distillate from such an operation. The lighter gravity oil thus produced may be used as such or in admixture with a portion of the oil as recovered from the sands. Instead of using all of the overhead distillate from the coking operation, a lower boiling fraction of the coke distillate, such as that boiling in the range of a heavy naphtha, kerosene, or light gas oil, may be employed, alone or in admixture with the recovered crude oil.

The solvent performs the function of dissolving the oil thereby reducing its viscosity and making it more mobile and susceptible to the stripping forces of the aqueous phase. It also reduces the specific gravity to a point below that of the aqueous phase, thus facilitating separation. This has the effect of reducing power and equipment requirements.

The amount of the solvent or diluent which is added will vary with the raw sands, and factors influencing the amount to be added are the porosity of the sand wherewith the voids between the grains are filled to a greater or lesser extent; the degree of saturation, i. e., the amount of bituminous matter present in the sand; the density, fluidity and melting point of the bitumen; the specific gravity of the diluent; and the viscosity of the resulting mixture of diluent and oil. I have found that the best separation takes place when the specific gravity of the bitumen is reduced to between 0.79 and 0.95 by the addition of a suitable amount of the lower gravity diluent.

If the specific gravity of the bitumen is about 1.025 (a common value for oils in sands found in the Athabasca River area and containing about 10–20% by weight of oil) and if a kerosene of about 0.75 specific gravity is used in equal parts by volume, the mixture of oil and kerosene will have a specific gravity of 0.887, which is within the desired range and has been found to be highly useful in this process.

In terms of percent by weight of the oil sand being processed when using, for example, kerosene or other solvent of similar characteristics with an oil sand of average oil content, the proportions may range from about 14% by weight to about 30% by weight, although more may be employed if desired, particularly where oils of higher bitumen content are encountered, or where the oil itself is fluid at about 70–80° F., and part of the effluent is recycled, the amount of solvent may be as little as 10% or less of the recovered product. It will be within the skill of the art following these teachings to determine the optimum proportions of solvent to employ in a given situation.

Since the oil sands as produced are to some extent consolidated any standard type of mixing equipment may be used to effect the mixing and disintegration of the oil sand.

It is possible to agitate the oil sand with an excess of water to partially disintegrate the mass and then to complete the disintegration upon the addition of the solvent or diluent. To accomplish this the mixture of oil and water may be fed as a slurry to a sand pump and the solvent added to the slurry in the pump. The resulting slurry of oil sand, water and diluent may be pumped through a length of pipe or circulated in a suitable vessel until the predetermined slurry density is attained. The sequence of mixing the water and the solvent with the sand is not of particular importance.

When the diluted oil is mixed with the aqueous phase in the critical proportions employed in this invention it appears to have a stripping effect whereby during agitation of the mixture, the aqueous phase coacts with the film of water on the sand particle to cause the mixture of oil and solvent to separate from each sand particle possibly as a multiplicity of minute droplets which are prevented from coalescing or from again contacting the sand, by the surrounding aqueous phase. The centrifuging generally follows immediately after the mixing operation and while the oil is in this state. In view of the critical quantities of water which must be employed, the water layer forms a barrier between the sand particles and the separated oil. In the process at least two volumes of aqueous phase are employed per volume of tar-sand. In the process a sufficient amount, generally about two volumes or more of aqueous phase, are employed, per volume of tar-sand. If the separation is effected before these droplets have any opportunity to recombine to form a continuous phase of oil, and if the aqueous phase is maintained around the sand phase, no recombination of the sand with the oil can occur. If on the other hand a continuous oil phase is permitted to come in contact with the sand, the water will be displaced and the sand will be wetted by the oil. If this occurs, no substantial separation by my process can be accomplished.

It is therefore necessary that the amount of water added be sufficient to complete saturate the sand (when it is formed into a layer by the pressure separation) and to provide a layer or barrier of water between the top of the sand and the bottom of the oil layer which separates (either in a centrifuge or in a pressure vessel), of sufficient magnitude so that under all operating conditions the oil layer is prevented from again contacting the sand. If this is not done the degree of recovery of oil will either be greatly diminished or substantially prevented. I have found that a barrier of one or more inches of water provides safe operation under most conditions.

For a better understanding of the proportion of water to be employed, reference is made to the fact that the operation can be carried out in either a batch or continuous operation. Under batch conditions the sand and diluent are thoroughly kneaded in order to form a solution of the oil and diluent. This mixture is then added with stirring to the aqueous phase, and the mixture passed into a centrifuge. A typical sample of Alberta oil sand determined by actual test was as follows: The volume of the voids between the sand particles was equal to 40% of the volume of the sand on an oil-free basis. The porosity was 85% saturated with oil. An amount of diluent equal to the volume of the contained oil was added. Thus, on the basis of 100 volumes of original oil sand, 40 volumes would represent the voids, 34 volumes of which would be occupied by raw oil. Six volumes of the added diluent would fill the remaining voids and 28 volumes of diluted oil would appear above the top of the sand layer, the total volume now being 128 volumes. Two times this, or 256 volumes of water is employed as the aqueous phase, this amounting to 2.56 times the volume of the original oil sand. If all of the oil is displaced by the water during the centrifuging operation, then 40 volumes of the aqueous phase will be required to fill the voids in the sand, leaving 216 volumes to form a water barrier between the clean sand and the oil layer. This proportion of water is equal to 2.16 times the volume of the original oil sand, meaning that the water barrier is about two times the depth of the sand. Therefore, for good separation on a batch basis, the water barrier should be approximately twice the depth of the sand and may extend up to about three times the depth of the sand. Above this there appears to be no particular advantage in increased depth of water barrier in the batch operation.

On a commercial basis, however, the operation would be conducted continuously. Under these conditions, the proportion of aqueous phase to oil sand, plus diluent, is somewhat different.

Outlets are provided by nozzles in the periphery of the bowl and by discharge rings so that there is a continuous discharge at the respective outlets of (1) a mixture or slurry of sand and water, (2) water, which is substantially free of coarse sand and oil but which may carry away part of the fine clays present in the raw sands, and (3), the oil layer.

Because of the erosive nature of the sand, it is desirable to separate it from the oil under conditions where the sand reaches a minimum velocity, consistent with thorough stripping of the oil.

In such a continuous machine, the mixture of oil sand, diluent and water, such as previously referred to, is fed into a central portion of the machine in such a way that it is discharged into the water barrier without passing outwardly to the periphery of the bowl. The sand in the mixture thus must pass through the water layer before it reaches the periphery of the bowl. This exerts a substantial and important stripping action, due to the resistance of the water to passage of the sand. In such an operation, therefore, there are two important factors causing displacement of the oil. The first is the stripping action just referred to, and the second is the "squeezing" action brought about by the pressure exerted on the particles by the water. The result is that all or substantially all of the oil is displaced from the sand and because of the difference in specific gravity, and of the centrifugal action, is forced inwardly through the water barrier to form an oil layer overlying it.

Since water must be removed from the machine, together with the sand, it is evident that the proportion of water to oil sand charged must be greater in this type of operation than in the batch operation, since some of the water must be used to assist in removing the sand. The maximum amount of sand that can be discharged through the sand discharge ports is an amount equal to about 60% in settled volume of the total passing through the sand outlet nozzle. Therefore, the minimum water requirement just to discharge the clean sand would be about 40% of the total volume of sand-water discharged, plus an amount that would fill the voids of the sand, which is about 40% of the sand volume. Therefore, the amount of water required for the purpose of discharging the sand is approximately 1.7 times the volume of the sand. In addition to this, sufficient water must be supplied to provide the water barrier referred to above.

Therefore, for continuous operation, the minimum of aqueous phase to be fed with the oil sand to be introduced into the centrifuge would be at least 1.7 times the volume of the clean sand plus sufficient water to provide a continuous water barrier between the oil layer and the sand layer. It has been determined that there is a relationship between the number of $g$'s applied and the depth of the water barrier ($g$'s equal apparent weight of the sand in an operating centrifuge, divided by its actual weight).

Thus, the product of the thickness of the water barrier in inches and the $g$'s of acceleration, equal a constant which has been found to be 2500. In order to minimize erosion of the machine, the combination of $g$'s and depth of water barrier should be one which will completely strip the sand with the least possible number of $g$'s effective to permit efficient separation of the oil. Therefore, in a continuous machine, the water barrier should be as deep as it is practical to make it in order to reduce the $g$'s and consequently minimize erosion. It is desirable to make the machines as large as possible in order to minimize their speed. Machines have been built and tested which provided water barriers of from one inch up to 12 inches in thickness. However, larger machines providing water barriers of 24–30 inches are possible, the limiting factors being the strength of materials combined with good engineering design. The minimum water requirements in such a continuous operation may be expressed as approximately four times the volume required to saturate the sand and is preferably somewhat greater than this.

Conditions vary from place to place in a given oil sand bed, and from one sand bed to another. These variables include the amount and viscosity of the oil, the character of the mineral content including the amount of clays, moisture, etc. and in the size of the sand particles to be separated. Varying degrees of force will be required to strip the oil from the sand and there may be variations in the optimum proportions of diluent and of aqueous phase employed. The revolutions per minute to supply the number of $g$'s necessary to permit effective separation will vary somewhat. The depth of the water barrier of a given machine will depend upon the size, and hence the size of the centrifuge must be large enough to provide a barrier of sufficient thickness to provide efficient oil recovery.

Most of the oil sands contain varying amounts of finely divided clay. This does not separate as readily as does the granular sand but it should be removed if the oil is to be used as a charging stock for conventional refinery operations, such as cracking and the like. It is possible to separate a substantially solid-free oil in a single operation by my process. However, higher revolutions per minute are required in such a single stage operation and the erosion difficulties, due to the sand, are consequently increased.

Therefore, I prefer to operate the process in two continuous stages. In the first, the sand is separated substantially completely in the centrifuge, operating at peripheral speeds approaching the minimum consistent with efficient recovery of the oil. The major portion of the water is likewise separated. The second stage is operated at higher peripheral speeds to remove the remaining finer solids and water.

I am aware of both the hot and cold water methods previously proposed in which attempts were made to strip the oil directly from the sand by the influence of the water and that these met with at least partial success on a laboratory scale but were commercial failures. I am likewise aware that the bituminous material has been extracted from the sands by means of solvents, this being a common laboratory method of determining the proportion of oil present in the sand. From a commercial standpoint, these processes have never met with acceptance or success.

The maintenance of this water barrier is also important since it affords a stripping action on the sand particles. A particle of sand surrounded by oil is, in the manner of this invention, ejected into this water barrier under the action of the centrifugal force whereupon, due to friction between the particle and the water, the oil is stripped from the sand, and due to its lesser specific gravity, migrates through the water layer to occupy a position above it. The stripping effect will depend to a large extent upon the thickness of the water barrier and it is, therefore, important that this barrier be maintained at a sufficient depth.

I believe myself to be the first to have discovered that by diluting the oil to reduce its viscosity and gravity to a point below that of water, and to use a critical minimum quantity of water under conditions to provide an aqueous barrier between the sand and any continuous oil phase which is formed and sufficient in depth to provide also the stripping effect, thereby producing a highly efficient, simple and commercially feasible method for recovering valuable oil from tar-sands at costs which are competitive with naturally produced petroleum.

The temperature at which the separation is effected is above the freezing point of the aqueous phase and is preferably at about that of the natural water supply. In summer no special temperature control is needed. In some localities in winter it is necessary to heat the sand to prevent freezing or so that the oil will not be too viscous. No exact control is required, however. Where the bitumen is normally solid, both solution and separation may be facilitated by warming to liquefy the bitumen, provided that this is not above the boiling point of the water. As a general rule, the use of the higher temperatures above the normal temperature of the plant water is of benefit when the oil being recovered is highly viscous, even in the presence of added diluent. The increase in the temperature lowers the viscosity of both the oil and the water, but does not change their relative specific gravities. The effect on the viscosity of the oils is, of course, greater than on the water. Not only is the oil stripped from the solid particles more readily, but these will pass through the water barrier considerably faster than at the lower tempertaures, which increases the capacity of the centrifuge. Heat is not essential for the operation but under certain conditions it speeds up the process and increases the capacity of the machines.

While water alone may be used with satisfactory results as the aqueous phase, it is sometimes desirable to add thereto, a surface active agent capable of lowering the surface tension of the aqueous phase. This should not be of a type or used in an amount which will cause emulsification nor should it be added in such quantities as will tend to form emulsions.

In the natural state, the surface tension of the oil constituent of the material is usually lower than the surface tension of the water constituent, probably because of the high mineral content of the waters found in association with bituminous materials in nature. If this natural relationship is reversed and the surface tension of the water reduced below that of the oil, more thorough separation will take place and the time required for centrifuging will be substantially reduced.

Surface tension agents capable of lowering the specific gravity of water are well known and are readily and commercially available. Examples are a fatty alcohol sulphate such as that marketed under the trade name "Dreft," a sulphate of mixed fatty acil monoglycerides such as those marketed under the trade name "Vel" and "Halo" or the ester of sodium sulfosuccinic acid known as "Aerosol" which can be dissolved in water through the use of an agent such as methyl hydrate. Water soluble soaps may be used but care with respect to the proportions employed must be exercised to guard against emulsion formation.

While the above are all acceptable surface active agents, I have found that a surface active agent prepared as a solution of the following:

Ethomid HT/60 (a solid chemical manufactured by the Chemical Division of Armour & Co., Chicago), dissolved in 10 times its volume of ethyl alcohol will give effective and economical results. This is a mixture of mono- and di-substituted amides made by treating unsubstituted amides with ethylene oxide.

The amount of surface active agent used is small, since too much of any surface active agent will tend to form undesirable emulsions, hence they do not materially raise production costs. Tests have shown that approximately .0025% of surface active agents by weight of aqueous phase is sufficient. This amount does not materially raise production costs.

The following comparative results, run as a batch, show the effect of varying degrees of dilution, and of the addition of a surface active agent and were arrived at through the following procedure.

A uniform sample of raw Alberta oil sand was divided into a number of equal portions. In each case two volumes of water were added after dilution, and the diluted sand and water thoroughly agitated before centrifuging.

Table I shows the results using kerosene (specific gravity=0.81) as the solvent.

Table II shows the results using re-cycled diluted oil recovered from the process (specific gravity=0.87) as the solvent.

TABLE I

*Kerosene as solvent, 2 volumes of water*

| Percentage Solvent by Weight of Oil Sands | Specific Gravity of Diluted Oil | Ratio by Volume Diluent: Oil | Net Oil Recovery (Percentage of Oil Content by Weight) | S. A.,[1] Percent |
|---|---|---|---|---|
| 50 | 0.842 | 5.25 | 91 |  |
| 30 | 0.859 | 3.15 | 91 |  |
| 25 | 0.865 | 2.63 | 91 |  |
| 10 | 0.910 | 1.05 | 87 | 98 |
| 7.5 | 0.923 | 0.78 | 63 | 77 |
| 5.0 | 0.942 | 0.52 | 54 | 71 |
| 2.5 | 0.973 | 0.26 | 44 | 44 |
| 0 | 1.02 | 0.00 | Nil | Nil |

[1] Surface active agent Ethomid HT/60, 1 part to aqueous phase 40,000 parts.

TABLE II

*Recycled diluted oil as solvent, 2 volumes of water*

| Percentage Solvent by Weight of Oil Sands | Specific Gravity of Diluted Oil | Ratio by Volume Diluent: Oil | Net Oil Recovery (Percentage of Oil Content by Weight) | S. A.,[1] Percent |
|---|---|---|---|---|
| 50 | 0.892 | 4.88 | 91 |  |
| 30 | 0.905 | 2.93 | 87 |  |
| 25 | 0.912 | 2.44 | 96 | 96 |
| 20 | 0.920 | 1.95 | 98 | 91 |
| 15 | 0.928 | 1.46 | 63 | 86 |
| 5.0 | 0.966 | 0.49 | 54 | 71 |
| 2.5 | 0.988 | 0.25 | 34 | 62 |
| 0 | 1.02 | 0.00 | Nil | Nil |

[1] Surface active agent Ethomid HT/60, 1 part of aqueous phase 40,000 parts.

Table I shows that when no solvent is used, the recovery of oil from the sands is nil. The data show that when the solvent is added in proportions amounting to about 0.5 to 5 volumes of diluent per volume of oil contained in the sands, recoveries of from more than 50% of the oil up to more than 90% of the oil can be obtained. Table I also shows that when a surface active agent is added in the areas of lower diluent ratios substantial improvement in oil recovery is obtained. This means that by use of a surface active agent in conjunction with the diluent and water a lower amount of diluent can be added than is otherwise necessary.

Table II shows that similar results are obtainable when using a portion of the recovered diluted oil as the solvent.

According to another embodiment of my invention, saline solutions are used instead of water alone as the aqueous medium. This saline solution in its preferred form is substantially saturated and should be an aqueous solution of a neutral salt soluble in water, which has the effect of increasing the specific gravity of the water and which, preferably, at the same time acts as an electrolyte. Sodium chloride and calcium chloride are examples of readily and cheaply available materials meeting these conditions. Other salts may be used but in general are more expensive.

If a saline solution is used, it will be found almost invariably that the salt in the water will tend to increase the surface tension of the water. There may thus be conveniently and effectively added to the saline solution a surface active agent such as one of the agents already mentioned which will tend to lower the surface tension of the aqueous phase below that of the oil phase. Here again emulsions are to be avoided if the full benefits of the process are to be realized.

It is essential that the aqueous phase, whether water, water with a surface active agent, saline solution or other, be added in a large excess so that during the centrifuging operation hereinafter described, a continuous barrier of aqueous medium is maintained between the sand and the oil constituent for the reasons already discussed in detail.

For optimum results, there is a definite relationship between the thickness of the water barrier and the speed of centrifuging. It is well known that at the periphery of a centrifuge, $g$'s (i. e., the relative number of gravities acting) $=\dfrac{RW^2}{g}$ where $R$=radius to the periphery of the bowl, $W$=rate of rotation in radians/sec. and $g$=32.3 ft./sec.$^2$.

It has further been found that for optimum results the thickness of the water barrier layer in inches $\times$ the number of $g$'s of centrifuge as calculated above should be approximately 2500, or expressed in another form $t$=thickness of water barrier layer$=\dfrac{2500\,g}{RW^2}$ or $\dfrac{80{,}500}{RW^2}$ In applying both of these relationships to typical Alberta oil sands, it has been found that approximately two volumes of aqueous medium is required to each volume of diluted raw oil-sand.

The regulation of the amount of aqueous phase to be added is well within the scope of the art having these arbitrary relationships in mind.

Once the minimum value of aqueous phase has been reached, there is little difference in the degree of recovery as additional aqueous phase is added. The addition of a large excess of aqueous phase over the minimum required for effective separation requires excessive power for centrifuging and reduced output in a continuous process, and the minimum for effective recovery therefore becomes the maximum for economic operation.

After the diluted oil sand has been introduced to the aqueous medium, the resulting mass is subjected to centrifugal force, this force being maintained for sufficient duration to permit the aqueous phase to displace the oil from the sand, the oil floating to the surface of the aqueous medium where it can be drawn off and further processed in a standard refinery.

In the batch operations, the complete separation and recovery of the bituminous constituents of the sand is not always effected. However, in continuous operations of the character described herein, I have succeeded in recovering all or substantially all of the oil from the sand when employing water barriers of from 1 inch to 12 inches in depth.

I have found, however, that in carrying out the method of my invention, an emulsion of oil in water or water in oil occasionally results. The precise reasons for this are, at present, unknown to me, although it may be due to the presence of natural emulsifiers such as clay in some oil sands. However, I have found that when such an emulsion does occur, it is usually not a "tight" emulsion, but may in fact, sometimes be only a "loose" mixture. In this latter case, separation of the two may be effected merely by permitting settling and, in any case, the emulsion may be broken up by any conventional means such as by heat or addition of a demulsifying agent. This emulsion, however, occurs only in the rare case, and in the great majority of operations, such clean separation is effected by my method that further treatment is unnecessary. The proportion of water used should be less than that which would result in the formation of stable emulsions.

While the invention has been described above in terms of the use of centrifuges, it is sometimes possible to use cyclone separators. These are often particularly effective in removing the coarser solids in the first stage of a two-stage separation, the high speed centrifuge being used in the final stage to remove the final particles of sand, clay and remaining water.

The method of my invention has been shown in practice to provide an excellent recovery and to yield a crude oil which is of high grade and substantially water free and which is moreover virtually solids free.

I claim:

1. The method of separating crude oil from bituminous sands which comprises diluting the oil phase through the addition of a diluent of lesser specific gravity than that of the oil in an amount sufficient to substantially reduce the specific gravity of said oil and to promote recovery of the oil, but in quantity insufficient to tend to emulsify the aqueous and oil phases under processing conditions, introducing an aqueous medium in the proportion of about two volumes per volume of oil, sand and diluent being processed to form a slurry, and applying sufficient centrifugal force to the slurry to effect a separation by densities of sand, an aqueous phase, and an oil phase substantially free from solids.

2. The method of separating crude oil from an oil-bearing sand which comprises forming a slurry of said sand, a hydrocarbon diluent of lesser specific gravity than that of the oil constituent of the sand, said diluent being in sufficient amount to reduce the specific gravity of said oil substantially below 1.0, and an aqueous medium; applying centrifugal force to the slurry to effect a separation by densities of a sand phase, an aqueous phase, and a diluted oil phase, said aqueous medium being present in the slurry in an amount sufficient to saturate the sand plus an excess sufficient to provide an aqueous barrier between the sand phase and the oil phase under the conditions employed in said centrifugal separation.

3. The method of claim 2 wherein sufficient aqueous medium is added to saturate the sand, plus an excess sufficient to provide an aqueous barrier of approximately $$\dfrac{80{,}500}{RW^2}$$

inches where R is the radius to the periphery of the centrifuge bowl and W is the rate of rotation of the centrifuge bowl in radians per second.

4. The method of claim 2 wherein said aqueous medium comprises an aqueous solution of a neutral salt soluble in water which has the effect of increasing the specific gravity of the water.

5. The method of claim 2 wherein said aqueous medium comprises an aqueous solution of a salt soluble in water which has the effect of increasing the specific gravity of the water and which acts as an electrolyte.

6. The method of claim 2 wherein said aqueous medium comprises a substantially saturated aqueous solution of a salt soluble in water which has the effect of increasing the specific gravity of the water.

7. The method of claim 2 wherein said aqueous medium comprises an aqueous solution of sodium chloride.

8. The method of claim 2 wherein said aqueous medium contains sufficient of a surface active agent to reduce the surface tension of the aqueous phase below that of the oil phase but insufficient to form undesirable emulsions.

9. The method of claim 2 wherein sufficient solvent is added to reduce the specific gravity of the said oil constituent to between about 0.79 and about 0.95.

10. The method of claim 2 wherein sufficient aqueous medium is added to provide an aqueous barrier of at least one inch in depth under processing conditions.

11. The method of claim 2 wherein said solvent is added in sufficient quantity to reduce the specific gravity of said oil constituent to from about 0.79 to about 0.95, and the amount of the aqueous phase in the slurry amounts to at least 1.7 volumes per volume of diluted oil sand.

12. A continuous process for separating crude oil from an oil-bearing sand which comprises subjecting a slurry of said sand, a solvent comprising hydrocarbons of lesser specific gravity than that of the oil in said sand, and water, to a first separation including subjecting the mixture to a relatively low centrifugal force, to separate the major portion of the coarser sand from the slurry, and then subjecting the slurry thus partially freed of sand to a substantially greater centrifugal force to separate the remaining solids, and water, from the diluted oil, the proportion of said solvent in said slurry being sufficient to reduce the specific gravity of the oil constituent of the sand to about 0.79 to about 0.95, and the amount of the water in the slurry being sufficient to saturate the sand plus an excess sufficient to provide an aqueous barrier between the sand phase and the oil phase under the conditions employed in said centrifugal separations.

References Cited in the file of this patent

UNITED STATES PATENTS

| | | |
|---|---|---|
| 1,514,113 | Trumble | Nov. 4, 1924 |
| 1,520,752 | Horwitz | Dec. 30, 1924 |
| 1,778,515 | Hampton | Oct. 14, 1930 |
| 2,453,060 | Bauer et al. | Nov. 2, 1948 |
| 2,503,175 | Smith | Apr. 4, 1950 |
| 2,524,859 | Van Dongen | Oct. 10, 1950 |
| 2,594,929 | Howell | Apr. 29, 1952 |